(12) United States Patent
Robinson

(10) Patent No.: US 12,145,493 B2
(45) Date of Patent: Nov. 19, 2024

(54) CABLE DISPENSING ASSEMBLY

(71) Applicant: PACIFIC PLANT HIRE PTY LTD, Red Hill Brisbane (AU)

(72) Inventor: Scott Albert Robinson, Red Hill Brisbane (AU)

(73) Assignee: Pacific Plant Hire Pty Ltd, Red Hill Brisbane (AU)

( * ) Notice: Subject to any disclaimer, the term of this patent is extended or adjusted under 35 U.S.C. 154(b) by 449 days.

(21) Appl. No.: 17/436,022

(22) PCT Filed: Mar. 3, 2020

(86) PCT No.: PCT/AU2020/050198
§ 371 (c)(1),
(2) Date: Sep. 2, 2021

(87) PCT Pub. No.: WO2020/176938
PCT Pub. Date: Sep. 10, 2020

(65) Prior Publication Data
US 2022/0176862 A1    Jun. 9, 2022

(30) Foreign Application Priority Data
Mar. 4, 2019 (AU) .............................. 2019900696

(51) Int. Cl.
*B60P 3/035*    (2006.01)
*B65H 49/32*    (2006.01)
(Continued)

(52) U.S. Cl.
CPC ............ *B60P 3/035* (2013.01); *B65H 49/321* (2013.01); *B65H 49/325* (2013.01); *B65H 49/34* (2013.01);
(Continued)

(58) Field of Classification Search
CPC .. B65H 75/403; B65H 57/26; B65H 2701/34; B60P 3/035
See application file for complete search history.

(56) References Cited

U.S. PATENT DOCUMENTS 2,498,609 A  *  2/1950  Reil ................... B65H 75/4497
                                                242/391.1
5,343,813 A  *  9/1994  Septer ..................... B60P 3/035
                                                  410/47
(Continued)

FOREIGN PATENT DOCUMENTS

AU    2013201258 A1    3/2014
AU    2013201258 B2    7/2016
(Continued)

OTHER PUBLICATIONS

Intellectual Property India, Examination Report issued in Indian Application No. 202147043759 (Apr. 19, 2023).
(Continued)

*Primary Examiner* — William A. Rivera
(74) *Attorney, Agent, or Firm* — Leydig, Voit & Mayer, Ltd.

(57) ABSTRACT

A cable dispensing vehicle comprising: a frame; at least one pair of ground contact wheels supporting the frame and for travelling over ground; opposed drum arms coupled to the frame for supporting a spindle for a drum of cable; and a cable shield fast with the frame and extending between a drum supported by the drum arms and the ground in use; wherein cable dispensed from an underside of the drum is shielded from the ground by the cable shield.

19 Claims, 8 Drawing Sheets

(51) Int. Cl.
  *B65H 49/34* (2006.01)
  *B65H 51/10* (2006.01)
  *B65H 57/18* (2006.01)
  *B65H 57/26* (2006.01)

(52) U.S. Cl.
  CPC ............ *B65H 51/10* (2013.01); *B65H 57/18* (2013.01); *B65H 57/26* (2013.01)

(56) References Cited

U.S. PATENT DOCUMENTS

| | | | | |
|---|---|---|---|---|
| 5,895,197 | A * | 4/1999 | McVaugh | B66C 1/66 |
| | | | | 414/911 |
| 6,347,761 | B1 | 2/2002 | Larson | |
| 6,554,221 | B2 | 4/2003 | Hinds | |
| 7,810,574 | B2 * | 10/2010 | Stukey | E21B 43/128 |
| | | | | 166/77.2 |
| 10,017,095 | B2 * | 7/2018 | Keast | B60P 3/035 |
| 10,301,149 | B2 * | 5/2019 | Franklin-Hensler | B65H 59/04 |
| 10,654,395 | B1 * | 5/2020 | White | B60P 1/16 |
| 10,745,237 | B2 * | 8/2020 | Russell | B65H 75/4486 |
| 10,822,194 | B1 * | 11/2020 | Hegler | B65H 75/4402 |
| 2004/0069331 | A1 * | 4/2004 | Garman | F28G 15/04 |
| | | | | 134/179 |
| 2008/0156925 | A1 * | 7/2008 | Cooper | B65H 49/12 |
| | | | | 242/564.3 |
| 2009/0127526 | A1 * | 5/2009 | Zaruba | B65H 51/10 |
| | | | | 254/371 |
| 2017/0297855 | A1 * | 10/2017 | Bortz | D07B 3/00 |
| 2018/0186269 | A1 * | 7/2018 | Barnett | B65H 49/32 |
| 2018/0282108 | A1 | 10/2018 | Russell et al. | |

FOREIGN PATENT DOCUMENTS

| | | |
|---|---|---|
| CN | 204103371 U | 1/2015 |
| JP | 3022076 B2 | 3/2000 |
| JP | 2015-155343 A | 8/2015 |
| NZ | 630934 A | 3/2016 |

OTHER PUBLICATIONS

Neumann Equipment, Handling Wire Rope Correctly—For use with Winches—[retrieved from internet on Apr. 29, 2021]<URL: https://web.archive.org/web/20170221130438/https://neumannequipment.com.au/news/handling-wire-rope-correctly> published on Feb. 21, 2017 as per Wayback Machine https://web.archive.org/web/20170221130325http://neumannequipment.com.au/documents/Handling-Wire-Rope-Correctly.pdf.
Australian Patent Office, International Search Report in International Application No. PCT/AU2020/050198 (May 21, 2020).
Australian Patent Office, Written Opinion in International Application No. PCT/AU2020/050198 (May 21, 2020).
Australian Patent Office, International Preliminary Report on Patentability (Chapter II) with Annex in International Application No. PCT/AU2020/050198 (Jun. 30, 2021).

* cited by examiner

CABLE DISPENSING ASSEMBLY

CROSS-REFERENCE TO RELATED APPLICATIONS

This patent application is the U.S. national phase of International Application No. PCT/AU2020/050198, filed on Mar. 3, 2020, which claims the benefit of Australian Patent Application No. 2019900696, filed Mar. 4, 2019, the disclosures of which are incorporated herein by reference in their entireties for all purposes.

TECHNICAL FIELD

This invention relates to a cable dispensing assembly that can be towed by a towing vehicle and which is suitable for dispensing cable from a drum.

BACKGROUND

The discussion of any prior art documents, techniques, methods or apparatus is not to be taken to constitute any admission or evidence that such prior art forms, or ever formed, part of the common general knowledge.

There is a need to be able to quickly lay electrical power cables in trenches in order to set up electrical distribution networks in new housing developments and mines for example. Electrical power cables for distributing sufficient current to power mining equipment of multiple dwellings are typically comprised of a number of conductors and sheaths of insulators. Consequently the cables are expensive and heavy.

Electrical cable is typically supplied on a large spool or drum which is heavy and may be cumbersome to handle. One problem that arises when dispensing electrical cable from a drum of cable is that it may inadvertently be dragged over rough ground which can cause the outer insulation layer to be damaged so that the cable must be withdrawn and replaced. When laying out cables it may be necessary to use cable rollers and/or stringers to convey cable from the drum to a point for dispensing the cable adjacent the drum. It would be desirable if an arrangement be provided that reduces the need for cable rollers and/or stringers.

It is an object of the present invention to provide an assembly for dispensing cable from a drum of cable which ameliorates or at least addresses at least one of the problems of the prior art or which at least provides a commercially useful alternative to cable dispensing assemblies that have hitherto been known in the past.

SUMMARY OF THE INVENTION

According to a first aspect of the present invention there is provided a cable dispensing vehicle comprising:
  a frame;
  at least one pair of ground contact wheels supporting the frame and for travelling over ground;
  opposed drum arms coupled to the frame for supporting a spindle for a drum of cable; and
  a cable shield fast with the frame and extending between a drum supported by the drum arms and the ground in use; wherein
  cable dispensed from an underside of the drum is shielded from the ground by the cable shield.

The cable dispensing vehicle may be provided in combination with the drum wherein the drum is loaded on the spindle and supported by the opposed drum arms.

In a preferred embodiment of the invention the opposed drum arms are each connected at a proximal end thereof to the frame by respective drum arm pivots. Preferably one or more drum arm actuators are included for swinging each of the drum arms about the drum arm pivots.

Preferably the opposed drum arms each end in respective spindle jaws for holding corresponding opposed ends of the spindle.

Preferably each spindle jaw is provided with a jaw actuator for opening and closing its respective spindle jaw.

In a preferred embodiment of the invention each of the drum arms are telescopic for length adjustment thereof for accommodating drums of different diameters. Preferably each of the drum arms is provided with a slider actuator for retracting or extending each drum arm.

In a preferred embodiment of the invention there is provided a powered drive wheel for rotating the drum for dispensing or reclaiming cable. The powered drive wheel is preferably located at a remote end of a drive wheel arm. Preferably the powered drive wheel is powered by a drive motor coupled thereto. In a preferred embodiment of the present invention the powered drive wheel is mounted at a remote end of a drive wheel arm. Preferably the drive wheel arm is coupled to one of the drum arms by a drive wheel pivot. In a preferred embodiment of the present invention a drive wheel arm actuator is disposed between a point on the drive wheel arm and a point on said drum arm for swinging the drive arm relative to the drum arm to thereby bring the drive wheel against and away from the drum in use.

Preferably a dispensing arm assembly extends from the frame for directing cable from the drum outwardly to a point lateral of the ground contact wheels. In a preferred embodiment of the invention the dispensing arm assembly is comprised of three members including a mast member that extends upwardly from the frame.

Preferably the dispensing arm assembly further includes a first lateral member that is pivotally connected to a remote end of the mast member.

Preferably a second lateral member is pivotally connected to a remote end of the first lateral member.

In a preferred embodiment of the invention a first dispensing arm assembly actuator is connected between a point on the mast member and a point on the first lateral member.

Preferably a second dispensing arm assembly actuator is connected between a point on the first lateral member and a point on the second lateral member whereby operation of said dispensing arm assembly actuators varies angles between the mast member and the first lateral member and between the first lateral member and the second lateral member.

Preferably the vehicle includes powered pinch rollers for assisting in passing cable along the dispensing arm assembly.

In a preferred embodiment of the invention the actuators comprise hydraulic rams and/or hydraulic motors.

Preferably a hydraulic circuit is provided for operating hydraulic motors driving the drive wheel and the pinch rollers. In a preferred embodiment of the invention hydraulic restrictors and one-way valves are provided to ensure that the pinch rollers run faster than the drum motor when dispensing cable and slower than the drum motor when reclaiming cable.

Preferably the vehicle includes a three point linkage fast with the frame for connection of the vehicle to a towing vehicle whereby the three point linkage allows the cable dispensing vehicle to be pulled and pushed by the towing vehicle for readily dispensing cable and rewinding dispensed cable.

According to a further aspect of the present invention there is provided a cable dispensing vehicle comprising:
a frame;
at least one pair of ground contact wheels supporting the frame;
opposed drum arms coupled to the frame and supporting a spindle with a drum of cable thereon; and
a cable shield fast with the frame and extending between the drum and the ground in use; wherein
cable dispensed from an underside of the drum is shielded from the ground by the cable shield.

Additional aspects of the invention may encompass novel combinations of the features of a cable dispensing vehicle described in the following detailed description.

BRIEF DESCRIPTION OF THE DRAWINGS

The Detailed Description is not to be regarded as limiting the scope of the preceding Summary of the Invention in any way. The Detailed Description will make reference to a number of drawings as follows.

DETAILED DESCRIPTION OF PREFERRED EMBODIMENT

Figure 1:
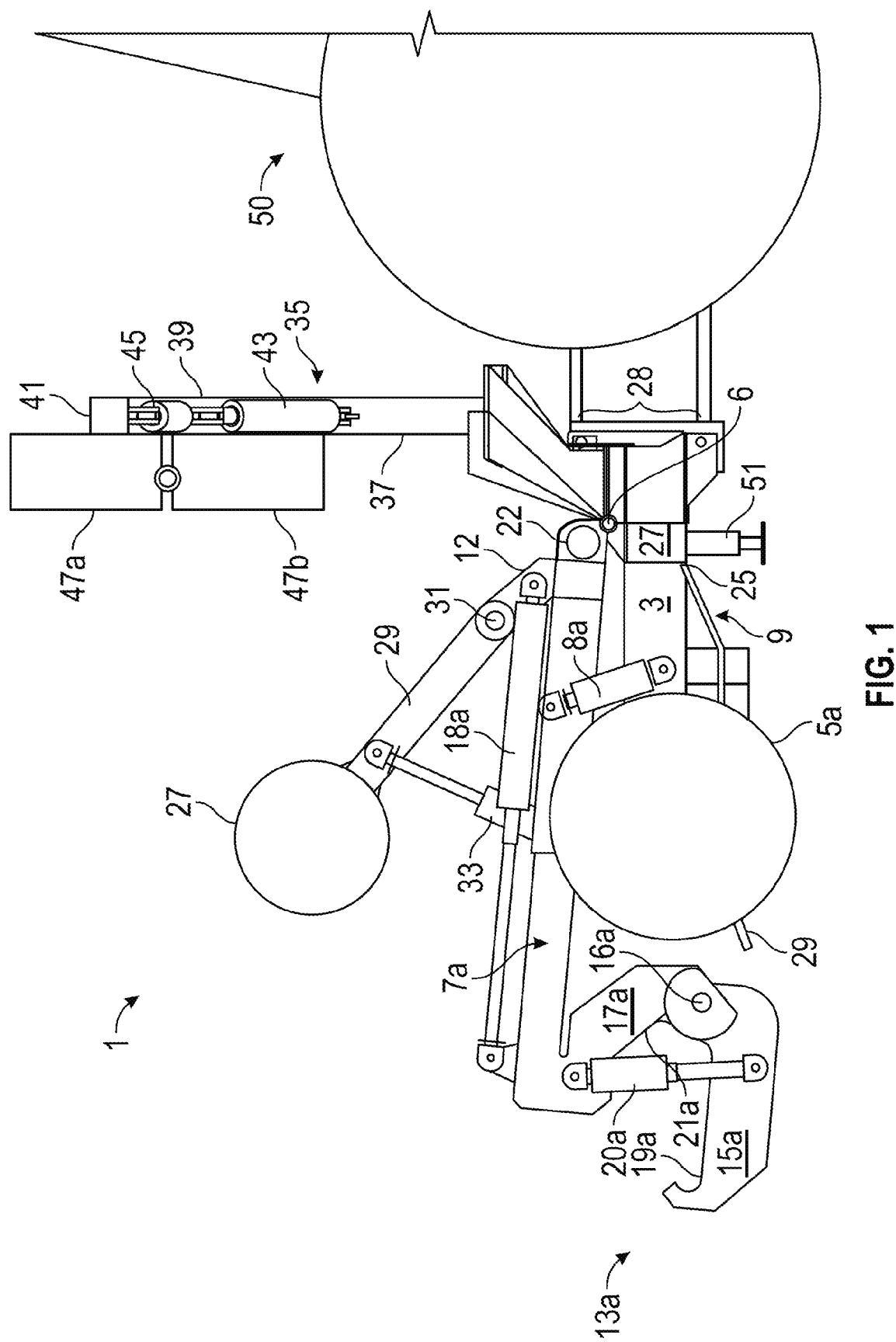
FIG. 1 depicts a right hand side of a cable dispensing vehicle according to a preferred embodiment of the invention shown coupled to a towing vehicle 50 and with drum arms and spindle jaws in an unloaded configuration.
Figure 2:
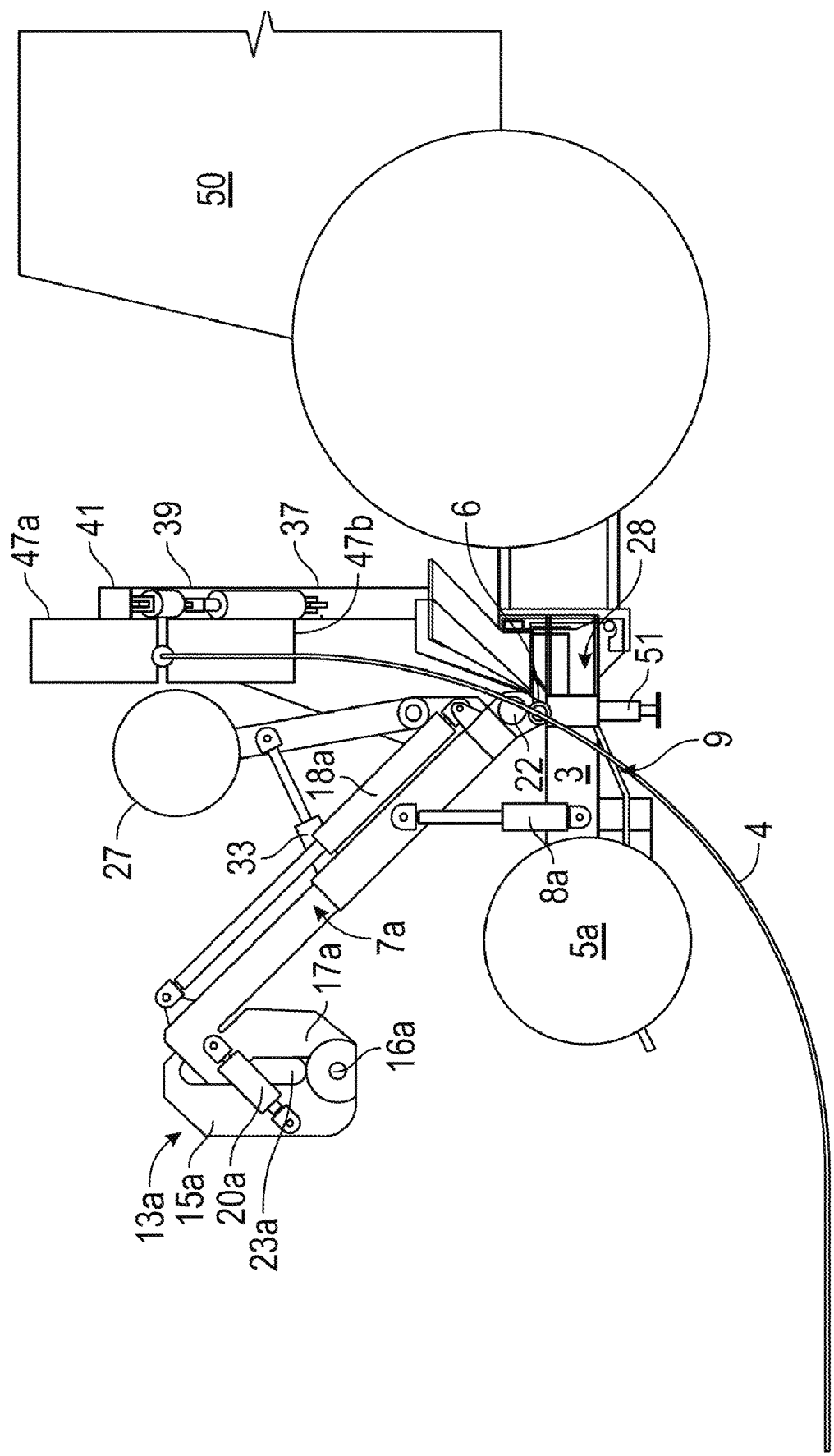
FIG. 2 depicts the drum dispensing vehicle of FIG. 1 with drum arms and spindle jaws in a loaded configuration.
Figure 3:
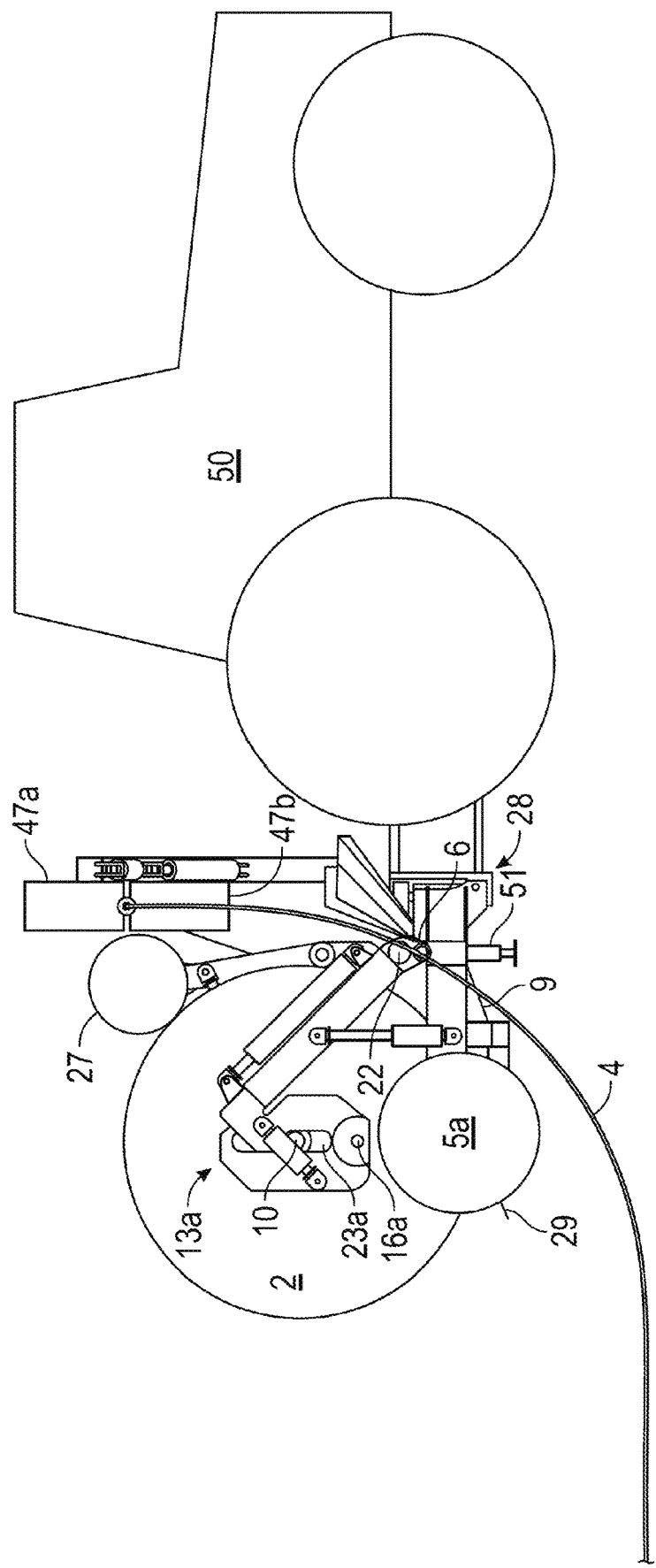
FIG. 3 depicts the drum dispensing vehicle loaded with a drum of cable and dispensing cable therefrom.

FIGS. 1 and 2 are side views of a cable dispensing vehicle 1 according to a preferred embodiment of the present invention. FIGS. 3 to 9 depict the cable dispensing vehicle 1 laden with a drum 2 of cable from which a cable 4 is dispensed. Vehicle 1 includes a frame 3 that is formed of a number of welded steel tubular members. A pair of ground contact wheels 5a, 5b are coupled to opposite sides of the frame 3 by stub axles and thus support the frame 3.

Two opposed drum arms 7a, 7b are coupled to the frame 3 and in use support ends of a drum spindle 10 that extends between them. Each of the opposed drum arms 7a, 7b are connected at one end to the frame by a drum arm pivot 6. Drum arm actuators in the form of hydraulic rams 8a, 8b are included for swinging each of the drum arms 7a, 7b about drum arm pivots 6. Proximal ends of each drum arm 7a, 7b, are connected to the pivots 6. The drum arms 7a, 7b are mechanically rigidly interconnected by a bar 22 to ensure that they operate in concert with each other. Each of the drum arms 7a, 7b are telescopic for length adjustment so that they can accommodate drums of different diameters. Slider actuators in the form of hydraulic rams 18a, 18b are mounted between relatively sliding portions of each of the drum arms 7a, 7b for retracting or extending each drum arm.

Each of the opposed drum arms 7a, 7b end opposite pivot 6 in respective spindle jaws 13a, 13b for holding corresponding opposed ends of the spindle 10. Each spindle jaw 13a, 13b is formed with a first jaw member 15a, 15b that is connected by a pivot 16a, 16b to a second jaw member 17a, 17b. The each of the second jaw members 17a, 17b extend at an angle of about 45 degrees from respective opposed drum arms 7a, 7b. The first and second jaw members 15a, 15B and 17a, 17b are formed with opposed elongate indentations 19a, 19b and 21a, 21b that define a slot 23a, 23b, therebetween when the first jaw 15a, 15b is swung about pivot 16a, 16b to close against the second jaw member 17a, 17b.

Each spindle jaw 13a, 13b is provided with a jaw actuator in the form of a ram 20a, 20b that extends between the first jaw member 15a, 15b and the second jaw member 17a 17b for opening and closing its respective spindle jaw by bringing the first jaw member 15a, 15b away and toward the second jaw member 17a, 17b.

A drum drive wheel 27, which is powered by a hydraulic motor 28 (identified in FIG. 7 and FIG. 8) is provided for rotating the drum 2 to aid in dispensing or reclaiming cable 4 depending on the direction of rotation of drum drive wheel 27. Drum drive wheel 27 is located at a remote end of a drive wheel arm 29 that is coupled, via spacer 12, to drum arm 7b by a drive wheel pivot 31. A drive wheel arm actuator in the form of a hydraulic ram 33 is disposed between a point on the drive wheel arm 29 and a point on drum arm 7b for swinging the drive wheel arm 29 relative to the drum arm 7b about the drive wheel pivot 31 to thereby bring the drive wheel against and away from the drum 2 in use.

Figure 4:
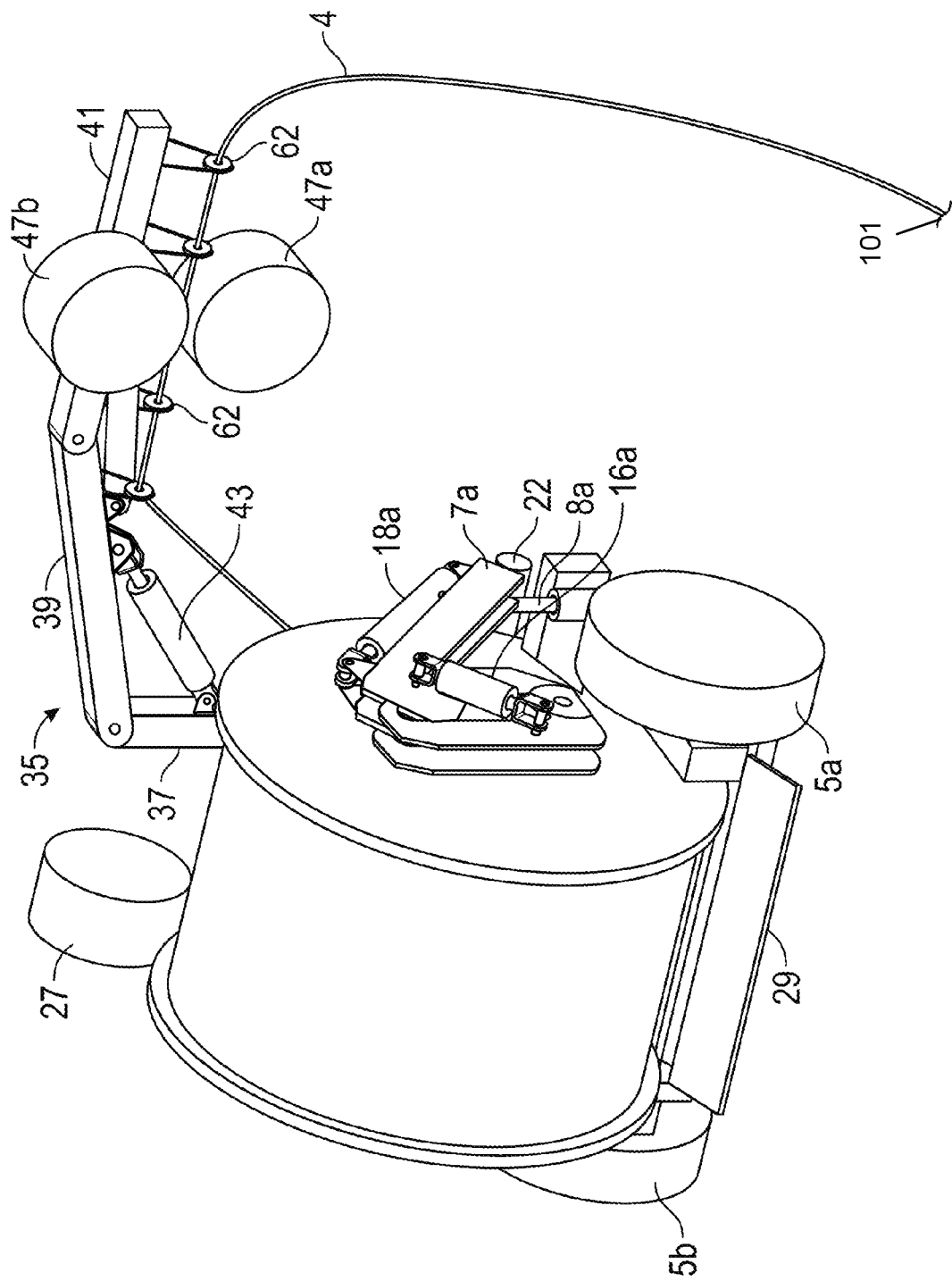
FIG. 4 is a view of the rear, right hand side and top of the drum dispensing vehicle loaded with a drum of cable and dispensing cable therefrom.
Figure 5:
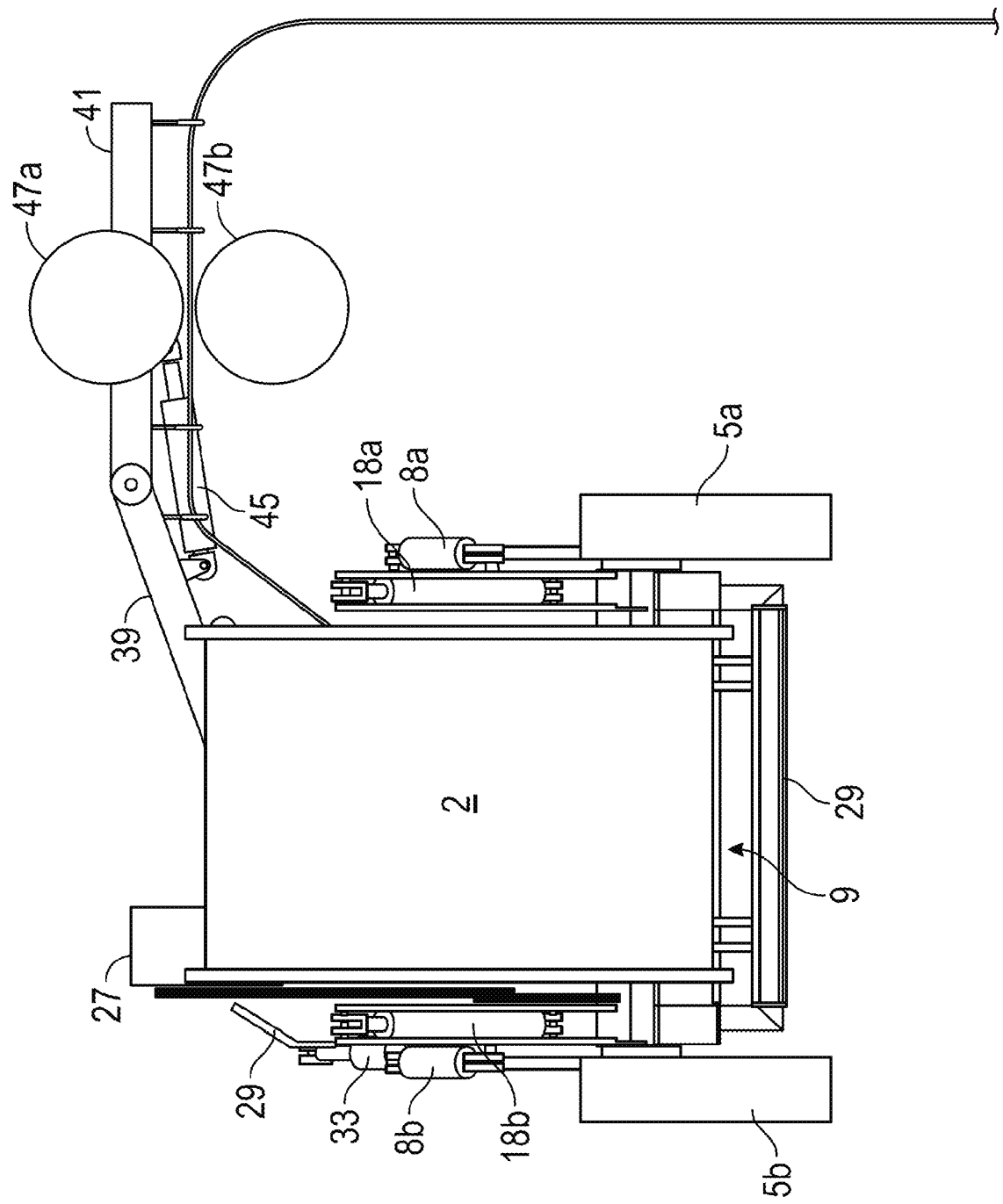
FIG. 5 is a view of the rear of the drum dispensing vehicle loaded with a drum of cable and dispensing cable therefrom.
Figure 6:
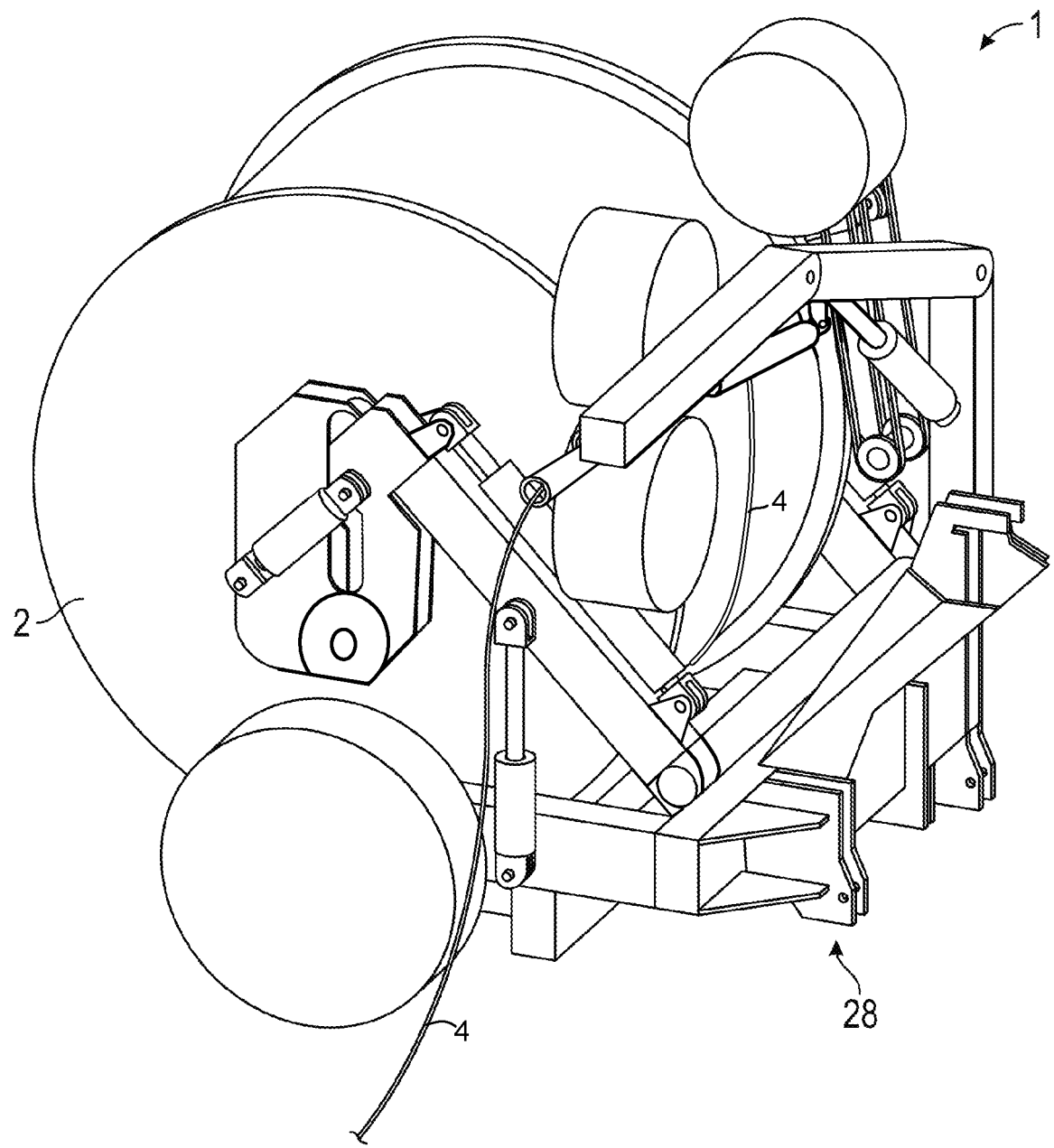
FIG. 6 is a view of front, right hand side and top of the drum dispensing vehicle loaded with a drum of cable and dispensing cable therefrom.

As best seen in FIG. 4, the dispensing arm assembly 35 extends from the frame for directing cable from the drum outwardly to a point 101 lateral of the ground contact wheels 5a, 5b. The dispensing arm assembly 35 includes three elongate members including a mast member 37 that is fixed relative to the frame 3 and which extends generally upwardly therefrom. The dispensing arm assembly 35 further includes a first lateral member 39 that is pivotally connected at a first end thereof to a remote (upper) end of the mast member. A second lateral member 41 is pivotally connected at its first end to a remote end of the first lateral member 39. Cable guides 62 are disposed along the first and second lateral members to assist in guiding the cable 4 out along the arms 39, 41.

A first dispensing arm assembly actuator in the form of a hydraulic ram 43 is connected between a point on the mast member 37 and a point on the first lateral member 39. A second dispensing arm assembly actuator in the form of a hydraulic ram 45 is connected between a point on the first lateral member 39 and a point on the second lateral member 41 whereby operation of said dispensing arm assembly actuators 43, 45 varies angles between the mast member 37 and the first lateral 39 member and between the first lateral member 39 and the second lateral member 41 so that the distance that the remote end of the second lateral member extends laterally outward can be varied as desired, which is useful when directing cable into a trench alongside a direction of travel of the trailer.

Preferably the vehicle includes pinch rollers 47a, 47b for assisting in passing cable along the dispensing arm assembly. The pinch rollers 47a, 47b are powered by respective hydraulic motors 49a, 49b (identified in FIG. 7).

In contrast to cable dispensing vehicles that are commonly known, the cable dispensing vehicle 1 is designed for the drum 2 to be orientated so that cable is dispensed from the lower side of drum. In order to prevent slack cable inadvertently falling on to the ground as it is dispensed a cable shield 9 is provided fast with the frame and extending between the drum and the ground in use. A leading end 25 of the cable shield 9 is welded or otherwise fixed to a transverse leading member 27 of the frame 3. The cable shield 9 extends rearwardly and generally downwardly from the leading end to a trailing end 29. The cable shield 9 is typically made of a tough material such as galvanised iron sheeting so that debris on the ground, for example rocks, which might damage the cable is deflected by the shield 9.

The cable dispensing vehicle 1 includes a three point linkage 28 that is fastened to a forward end of the frame 3. The three point linkage 28 is for connection of the vehicle to a towing vehicle 50 whereby the three point linkage allows the cable dispensing vehicle 1 to be pulled and pushed by the towing vehicle for readily dispensing cable and rewinding dispensed cable.

Figure 7:
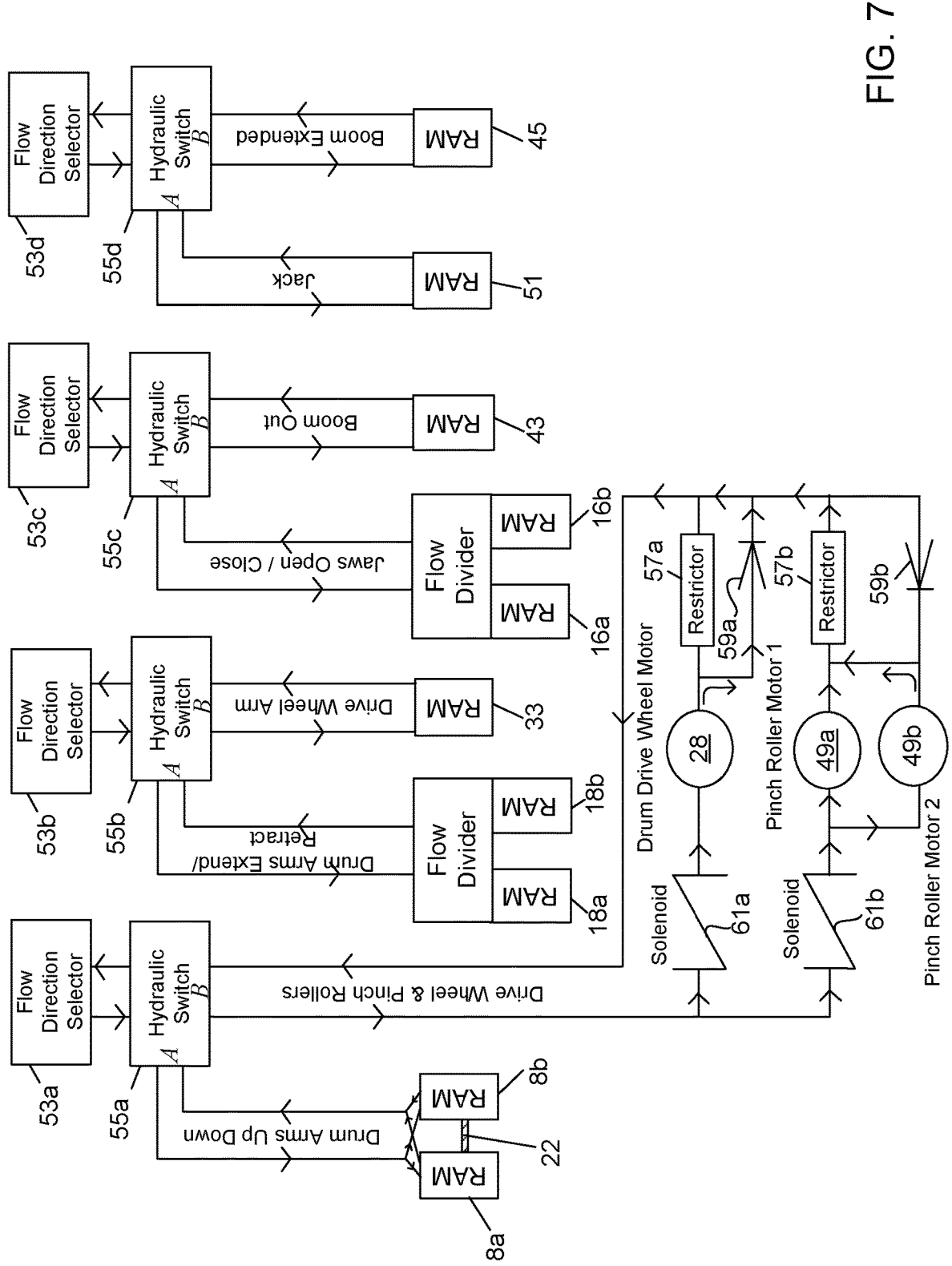
FIG. 7 is a block diagram of a hydraulic circuit of the drum dispensing vehicle with hydraulic fluid flowing in a first direction.
Figure 8:
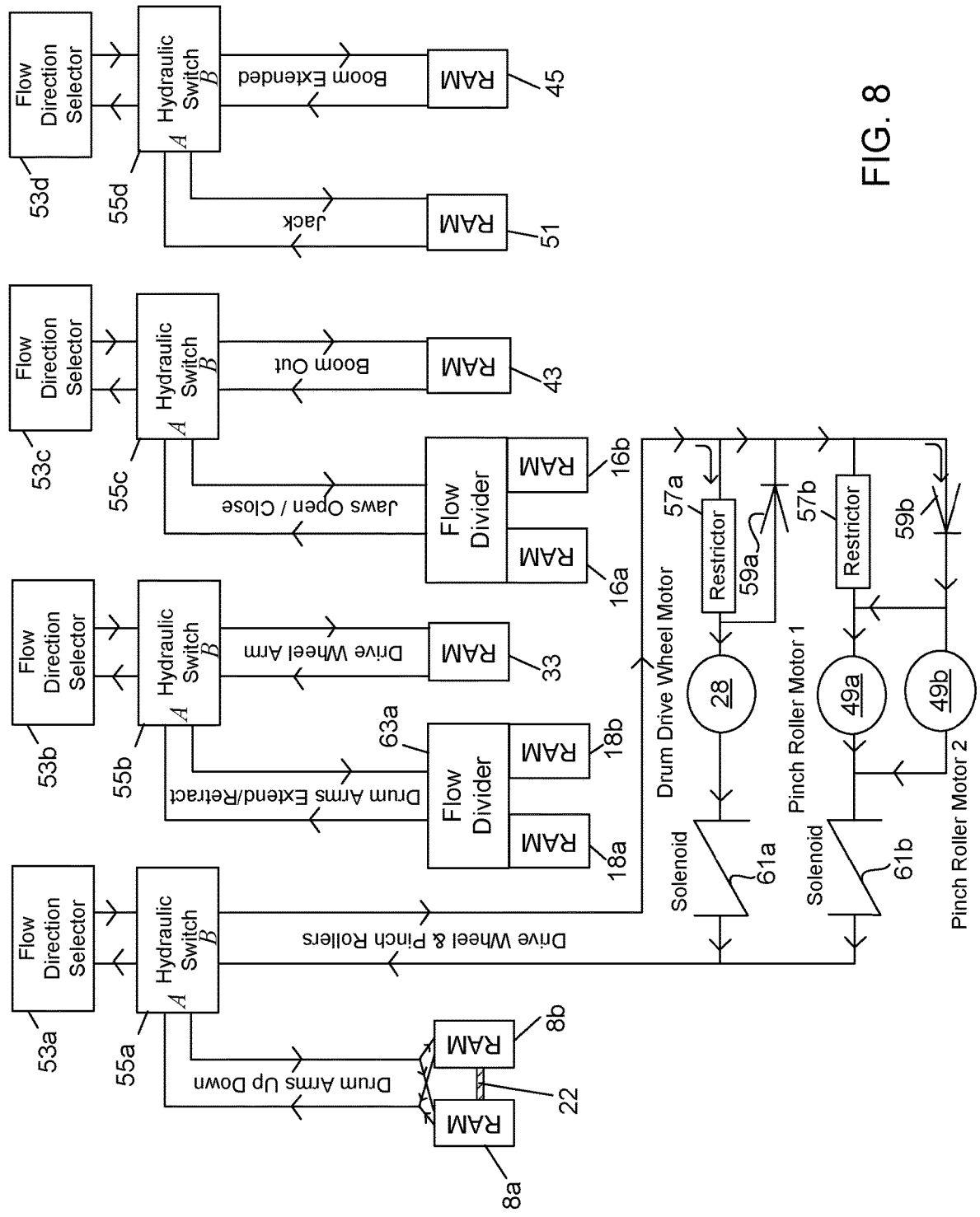
FIG. 8 depicts the hydraulic circuit of FIG. 7 with hydraulic fluid flowing in a second direction.

As depicted in FIGS. 7 and 8 a hydraulic circuit is provided for operating the various actuators, namely the RAMs (i.e. hydraulic cylinders) and the hydraulic motor driving the drive wheel and the hydraulic motor operating the pinch rollers. Four flow direction selectors 53a, . . . , 53d are provided that allow an operator to switch the flow direction through the paired hydraulic hoses that interconnect the various components of the circuit from a first direction (as shown in FIG. 7) to a second direction as shown in FIG. 8. Hydraulic switches 55a, . . . , 55d are coupled between each of the flow direction selectors 53a, . . . , 53d and various actuators. Consequently, by setting the appropriate flow direction using a flow direction selector and then by turning the hydraulic switch to select the desired actuators, the actuators can be operated in a desired direction.

For example, with flow direction selector 53a set to "forward" direction as shown in FIG. 7 and hydraulic switch 55a set to position "A" the drum arm RAMs 8a and 8b, which are mechanically rigidly interconnected by a bar 22, act in concert to pivot arms 7a and 7b up, for example from the position shown in FIG. 1 to the position shown in FIG. 2. Reversing the direction of flow direction selector 53a (to cause the reverse flow direction indicated in FIG. 8) will cause the drum arm RAMs 8a and 8b to retract thereby pivoting arms 7a and 7b back down.

Similarly the drum arm extend and retract RAMs 18a and 18b can also be selected by switching the hydraulic switch 55b to position "A" and powering them either in a forward direction, to extend the RAMs as indicated by the flow arrowheads in FIG. 7 or by selecting reverse flow with flow direction selector 53b to retract them. The RAMs 18a and 18b are not mechanically interconnected and thus a flow divider 63a is provided to ensure that they operate in concert. Similarly a flow divider 63b is provided to hydraulically couple jaw actuator RAMs 16a and 16b. The boom RAM 43 may be extended and retracted by selecting position "B" with hydraulic switch 55c and then selecting either the forward or reverse flow direction with flow direction selector 53b. The various other RAMs 33, 51 and 45 are similarly selected with corresponding hydraulic switches 55b, 55c and 55d and either retracted or extended by use of flow direction selectors 53b to 53d.

Switching the hydraulic switch 55a to position "B" and with the flow direction selector 53a in the forward position to cause the flow direction indicated in FIG. 7, with solenoids 61a and 61b both energized so that they are open circuit, causes hydraulic fluid to flow through solenoid 61a and through solenoid 61b in parallel. Hydraulic fluid that flows through solenoid 61a then proceeds through drum drive wheel motor 28, so that the drum wheel motor turns the drum drive wheel 27, and thence through one way valve 59a. Hydraulic fluid that flows through solenoid 61b then proceeds through both pinch wheel motors 49a and 49b in parallel thereby rotating them each in a first direction. The one way valve 59b is orientated in a counter flow direction and so the fluid from both pinch wheel motor 49a and pinch wheel motor 49b passes through flow restrictor 57b. Reversing the direction of the flow direction selector 53a (to cause the reverse flow direction indicated in FIG. 8) causes the fluid to flow, in a first parallel branch, through restrictor 57a since one way valve 59a is orientated in a counter flow direction and thence through drum drive wheel motor 28 to return through solenoid 61a. In a second parallel branch, the fluid flows through one way valve 59b, which is orientated in the direction of flow, rather than restrictor 57b, and thence through parallel pinch roller motors 49a, 49b thereby causing them each to rotate in a second direction and then returns through the open solenoid 61b. The solenoids 61a and 61b may be operated independently so that only the drum wheel drive motor 28 is activated or the pinch roller motors 49a, 49b are operated without the drum drive wheel motor being operated.

In use an operator couples trailer 1 to a towing vehicle 50 by means of three-point-linkage 28 and connects the hydraulic circuit of trailer 1, illustrated in FIGS. 7 and 8, to a hydraulic power circuit of the towing vehicle 50. The operator then operates the flow direction selectors 53a, . . . , 53d to retract jack 51, extend the drum arms using RAMs 18a,18b and swing them upward with RAMs 8a, 8b so that jaws 13a, 13b are open around the ends of drum spindle 10. The jaw RAMs 16a, 16b are then operated to close the jaws around the spindle and the arm actuators 8a, 8b are then operated to lift the drum up. The towing vehicle 50 then tows the trailer 1 to a location adjacent a trench into which cable is to be dispensed.

The cable leaves the drum on the underside of the drum, between the underside of the drum and the cable shield 9 and is then threaded through the cable guides 62 on the cable dispensing assembly and between the pinch rollers 47a, 47b. The boom RAMs 43 and 45 are then operated to bring the end of the arm over the trench, which is a point lateral of the closest wheel 5a. The drive wheel arm is then pivoted by operating drive wheel arm RAM 33 to bring the drum drive wheel 27 against the rim of the drum 2. Solenoids 61a and 61b are then operated as shown in FIG. 7 to cause the drum wheel drive motor 28 and the pinch drive wheel roller motors 49a and 49b to rotate so that cable is fed from the drum out into the trench. At the same time the towing vehicle 50 moves forward leaving dispensed cable trailing in the trench. If necessary the direction of the drum wheel drive motor 28 and the pinch rollers 49a, 49b can be reversed, previously as explained with reference to FIG. 8 and the towing vehicle reversed in order to reclaim the dispensed cable. In either direction, the cable that leaves the drum, or which is reclaimed back onto the drum, is shielded from rocks and debris on the underlying ground by the cable shield 9.

By having the cable dispensed from the underside of the drum the horizontal distance from the point of dispensing the cable from the drum to the dispensing arm assembly 35 is reduced (relative to systems that dispense from the topside of the drum) thereby avoiding the need for cable rollers or stringers to cover the additional horizontal distance that would be required if the cable were dispensed from the topside of the drum. Furthermore, shield 9 protects the cable as it is dispensed from the underside of the drum from debris such as rocks and foliage on the ground.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A cable dispensing vehicle comprising:
    a frame;
    at least one pair of ground contact wheels supporting the frame and for travelling over ground;
    opposed drum arms coupled to the frame for supporting a spindle for a drum of cable;
    a cable shield fast with the frame and extending between the drum supported by the drum arms and the ground in use; and
    a dispensing arm assembly extending upwardly from the frame for outwardly directing cable from the drum;
    wherein cable dispensed from an underside of the drum is shielded from the ground by the cable shield, and
    wherein the vehicle includes powered pinch rollers for assisting in passing cable along the dispensing arm assembly.

2. The cable dispensing vehicle according to claim 1, wherein the opposed drum arms are each connected at a proximal end thereof to the frame by respective drum arm pivots.

3. The cable dispensing vehicle according to claim 2, wherein one or more drum arm actuators are included for swinging each of the drum arms about the drum arm pivots.

4. The cable dispensing vehicle according to claim 3, wherein said actuator or said actuators comprise hydraulic RAMs.

5. The cable dispensing vehicle according to claim 1, wherein the opposed drum arms each end in respective spindle jaws for holding corresponding opposed ends of the spindle.

6. The cable dispensing vehicle according to claim 5, wherein each spindle jaw is provided with a jaw actuator for opening and closing its respective spindle jaw.

7. The cable dispensing vehicle according claim 1, wherein each of the drum arms are telescopic for length adjustment thereof for accommodating drums of different diameters.

8. The cable dispensing vehicle according to claim 7, wherein each of the drum arms is provided with a slider actuator for retracting or extending each drum arm.

9. The cable dispensing vehicle according claim 1 including a powered drive wheel for rotating the drum for dispensing or reclaiming cable.

10. The cable dispensing vehicle according to claim 9, wherein the powered drive wheel is located at a remote end of a drive wheel arm; and/or wherein the powered drive wheel is powered by a drive motor coupled thereto; and/or wherein the powered drive wheel is mounted at a remote end of a drive wheel arm, wherein the drive wheel arm is coupled to one of the drum arms by a drive wheel pivot.

11. The cable dispensing vehicle according to claim 10, wherein a drive wheel arm actuator is disposed between a point on the drive wheel arm and a point on said drum arm for swinging the drive wheel relative to the drum arm to thereby bring the drive wheel against and away from the drum in use.

12. The cable dispensing vehicle according to claim 1, wherein the dispensing arm assembly directs cable from the drum outwardly to a point lateral of the ground contact wheels.

13. The cable dispensing vehicle according to claim 12, wherein the dispensing arm assembly comprises three members including a mast member, wherein the dispensing arm assembly further includes a first lateral member that is pivotally connected to a remote end of the mast member.

14. The cable dispensing vehicle according to claim 13, wherein a second lateral member is pivotally connected to a remote end of the first lateral member.

15. The cable dispensing vehicle according to claim 13, wherein a first dispensing arm assembly actuator is connected between a point on the mast member and a point on the first lateral member.

16. The cable dispensing vehicle according to claim 15, wherein a second dispensing arm assembly actuator is connected between a point on the first lateral member and a point on the second lateral member whereby operation of said dispensing arm assembly actuators varies angles between the mast member and the first lateral member and between the first lateral member and the second lateral member.

17. The cable dispensing vehicle according to claim 1, including a three point linkage fast with the frame for connection of the vehicle to a towing vehicle whereby the three point linkage allows the cable dispensing vehicle to be pulled and pushed by the towing vehicle for readily dispensing cable and reclaiming dispensed cable.

18. The cable dispensing vehicle according to claim 1, wherein the cable shield depends from the frame.

19. The cable dispensing vehicle according to claim 1, wherein the cable shield comprises a leading edge fixed to the frame and a trailing end that extends rearwardly and downwardly from the leading end to the trailing end.

* * * * *